(12) United States Patent
Mack

(10) Patent No.: US 7,726,917 B2
(45) Date of Patent: Jun. 1, 2010

(54) POWER DRILL

(75) Inventor: Hans-Dieter Mack, Sontheim (DE)

(73) Assignee: Rohm GmbH, Sontheim (DE)

( * ) Notice: Subject to any disclaimer, the term of this patent is extended or adjusted under 35 U.S.C. 154(b) by 967 days.

(21) Appl. No.: 11/453,086

(22) Filed: Jun. 14, 2006

(65) Prior Publication Data

US 2006/0284386 A1    Dec. 21, 2006

(30) Foreign Application Priority Data

Jun. 15, 2005   (DE) ................. 10 2005 027 523

(51) Int. Cl.
*B23B 31/16*   (2006.01)
*B23B 31/173*  (2006.01)

(52) U.S. Cl. .................. 408/124; 408/240; 279/64; 279/140; 279/157; 279/902

(58) Field of Classification Search ........... 279/60–62, 279/64, 140, 157, 902; 408/124, 240; *B23B 31/16, B23B 31/173*
See application file for complete search history.

(56) References Cited

U.S. PATENT DOCUMENTS

| 1,159,344 | A | * | 11/1915 | Van Ness | 279/64 |
| 3,970,323 | A | * | 7/1976 | Schnizler, Jr. | 279/64 |
| 4,213,623 | A | * | 7/1980 | Rohm | 279/140 |
| 4,302,021 | A | * | 11/1981 | Rohm | 279/60 |
| 4,456,271 | A | * | 6/1984 | Kern et al. | 279/91 |
| 4,527,809 | A |   | 7/1985 | Umbert | 279/64 |
| 4,695,065 | A |   | 9/1987 | Komatsu | 279/60 |
| 5,031,925 | A |   | 7/1991 | Tatsu | 279/64 |
| 5,232,230 | A | * | 8/1993 | Lin | 279/62 |
| 5,407,215 | A | * | 4/1995 | Yang | 279/64 |
| 5,499,830 | A | * | 3/1996 | Schnizler | 279/62 |
| 5,685,549 | A | * | 11/1997 | Yang | 279/64 |
| 5,918,886 | A |   | 7/1999 | Horiuchi | 279/58 |
| 7,156,402 | B2 | * | 1/2007 | Mack | 279/60 |
| 7,503,565 | B2 | * | 3/2009 | Rohm | 279/60 |
| 2006/0208435 | A1 | * | 9/2006 | Rohm | 279/140 |
| 2007/0235951 | A1 | * | 10/2007 | Mack | 279/60 |
| 2007/0273109 | A1 | * | 11/2007 | Mack et al. | 279/140 |
| 2008/0217869 | A1 | * | 9/2008 | Mack | 279/62 |
| 2009/0058019 | A1 | * | 3/2009 | Mack | 279/114 |

FOREIGN PATENT DOCUMENTS

| DE | 3713457 C1 | * | 9/1988 |
| JP | 02172605 A | * | 7/1990 |

* cited by examiner

*Primary Examiner*—Eric A Gates
(74) *Attorney, Agent, or Firm*—Andrew Wilford

(57) ABSTRACT

A drill chuck has a chuck body having a forwardly open large-diameter threaded bore centered on an axis and a rearwardly open bore also centered on the axis and of small diameter. A power-unit spindle end is threaded into the small-diameter bore and projects axially forward into the large-diameter bore. A sleeve assembly axially fixed but rotatable on the chuck body is formed centered on the axis with a plurality of axially extending, angularly spaced, and forwardly open angled guides slidably receiving jaws. A coupling body has a large-diameter rear end threaded into the forwardly open large-diameter bore of the chuck body and a front end fitted to and angularly coupled to the jaws so that rotation of the sleeve assembly, jaws, and coupling body relative to the chuck body axially shifts the jaws.

10 Claims, 4 Drawing Sheets

POWER DRILL

FIELD OF THE INVENTION

The present invention relates to a power drill. More particularly this invention concerns such a drill having a self-tightening chuck.

BACKGROUND OF THE INVENTION

A standard drill chuck has a chuck body that is mounted on the spindle or arbor of a drill power unit or other similar machine and that is provided externally with a so-called tightening sleeve. A plurality of angularly equispaced jaws are provided between this sleeve, and the chuck body is provided with formations that can move these jaws radially toward each other or radially apart on relative rotation of the tightening sleeve and the chuck body. Normally the jaws are spring-loaded radially outwardly. They are moved radially inwardly when the tightening sleeve is rotated relative to the chuck body by being pushed forward on an inner frustoconical surface of the tightening sleeve.

In order to prevent such a chuck from loosening it is known to provide a ratchet arrangement that normally only allows the tightening sleeve to rotate in the tightening direction on the chuck body. A ratchet pawl is pivotal about an axis parallel to the chuck axis on a special holding ring clamped to the chuck body. Teeth are formed on the so-called pressure ring that is threaded to the tightening sleeve and that serves to axially fix the tightening sleeve relative to the chuck body. This pawl has a button projecting radially out of the holding ring through a window formed therein and is not only spring loaded into position with its end engaged in the teeth of the pressure ring, but is also so counterbalanced that radially outwardly effective centrifugal force will increase the radial inward force of its tooth into the teeth of the pressure ring.

An improvement on such an arrangement is described in U.S. Pat. No. 4,302,021. It has a ratchet pawl carried on the pressure ring that is fixed to the tightening sleeve. A release ring is provided which is angularly displaceable on the chuck between a holding position which allows the tension spring of the ratchet pawl to press the end of the pawl against the teeth and a releasing position holding the end of the pawl out of engagement with these teeth.

Such a chuck works very well, but is often somewhat long, measured parallel to its axis. Thus the drill itself presents itself as a fairly long and bulky tool, largely because of the length of the chuck.

OBJECTS OF THE INVENTION

It is therefore an object of the present invention to provide an improved drill.

Another object is the provision of such an improved drill that overcomes the above-given disadvantages, in particular that has a particularly compact and efficient chuck.

SUMMARY OF THE INVENTION

A drill has according to the invention a drive unit having an output drive spindle having a threaded outer end of a predetermined small diameter and centered on and rotatable about an axis, a chuck body having a forwardly open large-diameter threaded bore centered on the axis and a rearwardly open bore also centered on the axis and of the small diameter. The spindle end is threaded into the small-diameter bore and projecting axially forward into the large-diameter bore, a sleeve assembly axially fixed but rotatable on the chuck body and formed centered on the axis with a plurality of axially extending, angularly spaced, and forwardly open angled guides, respective jaws slidable along the guides, and a coupling body having a large-diameter rear end threaded into the forwardly open large-diameter bore of the chuck body and a front end fitted to and angularly coupled to the jaws so that rotation of the sleeve assembly, jaws, and coupling body relative to the chuck body axially shifts the coupling body in the chuck body and axially and radially slides the jaws in their guides.

The length of the free end of a half-inch diameter drilling spindle is about 14 to 16 mm, however in order to securely transfer torque from the drilling spindle to the chuck body a shorter thread length in the range of 8 to 10 mm is sufficient, and the spindle hole can be dimensioned accordingly, so that the drilling spindle projects into the forwardly open hole of the chuck body and according to the invention the free end of the drilling spindle in the forwardly open hole of the chuck body overlaps the lateral walls of the coupling body defining the blind hole, and that the drill chuck of the drill according to the invention can be configured shorter corresponding to the overlap. This reduces the length and weight and reduces top heaviness. The cost savings with regard to both the material and the machining of the material are considerable.

Additionally it is preferred if a locking system is provided at the end of the drilling spindle facing the coupling body for receiving a locking body that is fits in the forwardly open hole of the chuck body. The locking body serves to secure the chuck body to the drilling spindle and prevent it from loosening when the drill chuck is driven in the direction in which also the chuck body can be screwed off the drilling spindle.

This system at the same time makes it possible to provide a spacer sleeve comprising an axial passage for the locking body in the forwardly open hole of the chuck body, which sleeve is then inserted in a correspondingly deeper blind hole.

Another preferred embodiment of the invention is characterized in that the sleeve assembly includes an outer sleeve and an inner ring that are limitedly rotatable relative to each other, as well as a latch system that comprises an annular array of teeth on the chuck body and a pawl pressed against the teeth by a spring and mounted on the ring. This pawl prevents rotation of the ring and outer sleeve in a loosening direction when the pawl is engaged in the teeth, but allows relative rotation in the opposite tightening direction.

Furthermore according to the invention stops are provided on the ring and counter-stop faces are provided on the outer sleeve to define a pair of end positions that in turn limit the relative rotation of the outer sleeve relative to the ring. The latch system further comprises a cam on the sleeve that engages the pawl in only one of the end positions to move it into the freeing position out of engagement with the teeth, thereby allowing the chuck to be loosened. The pawl and cam are oriented such that when the sleeve is rotated in the loosening direction, the pawl is cammed into the freeing position, but when the sleeve is rotated in the tightening direction, the cam moves off the pawl and allows it to latch the chuck against loosening.

This embodiment as well, in which a latch system secures the tensioned state of the drill chuck during drilling operation, is characterized by a design that can be produced cost efficiently because complex machining operations of the ring for forming the stops are not required since only the bores for receiving pins forming the stops have to be produced. In this case it has also proven advantageous if a detent system a spring detent that releasable retains the sleeve in each of it send positions is provided. Such a spring is simply carried on the stop pins and fits in radially inwardly open seat recesses cut in the sleeve. Such a detent prevents the chuck from rattling out of the latched nonloosening position or vice versa, but is still simple and intuitively operable.

When the coupling body forms an axial passage, from the axial front end to the center hole, accessibility of the locking body is maintained, and assembly and disassembly of the drill chuck on the drilling spindle are possible without difficulty through the entire service life of the drill.

To prevent drilling particles or ships from penetrating into the axial passage, the axial front end of the axial passage is covered by a cover plate, which offers the additional advantage that the end of a tool spindle can be supported on this cover plate and does not penetrate too deeply into the drill chuck.

To establish an easy connection of the cover plate to the coupling body, it has an external thread fittable in an internal thread formed in the axial passage. Furthermore, the cover plate has a non-central tool seat on the side facing away from the drilling spindle so it can be screwed in or out.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
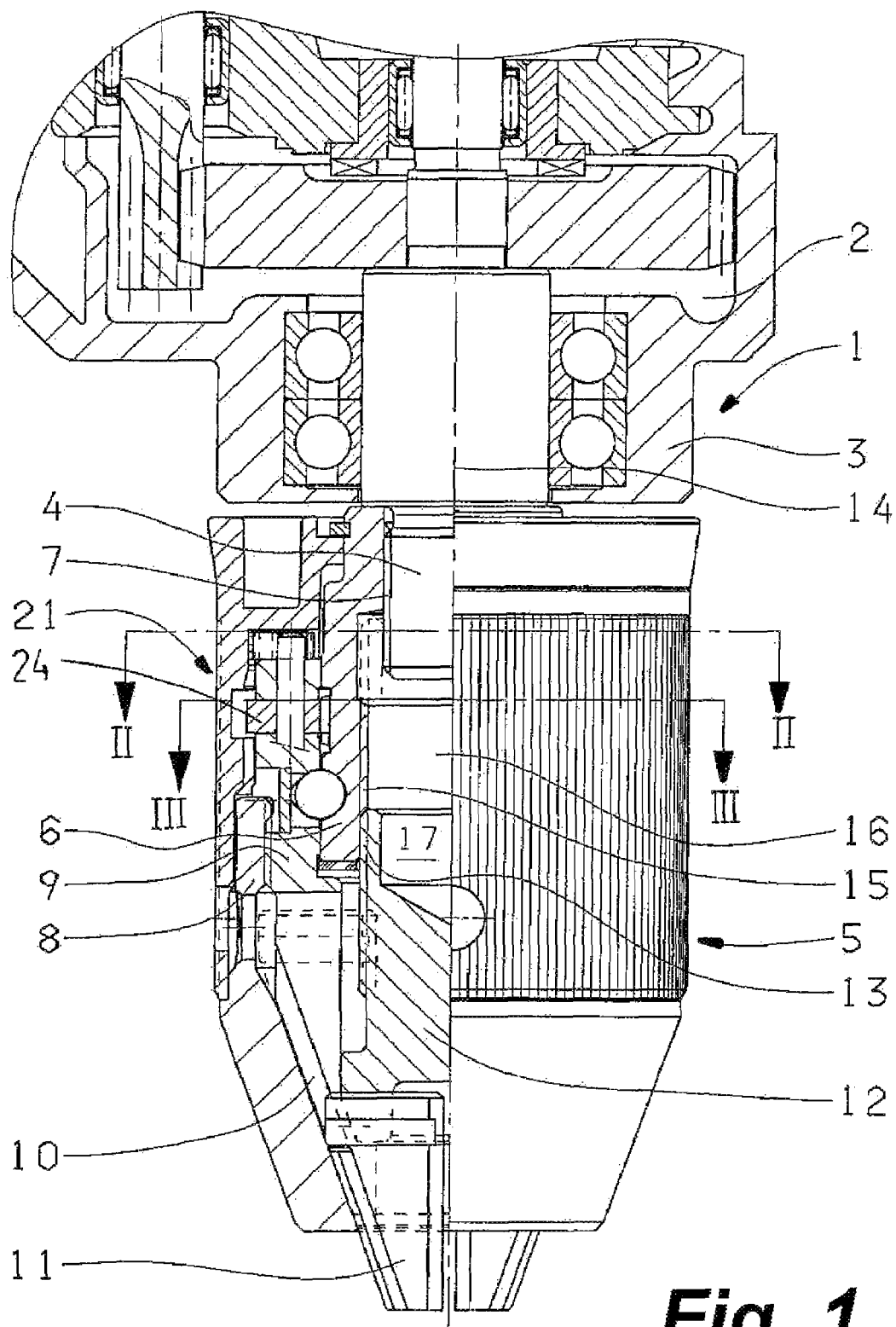
FIG. 1 is an axial section through the chuck region of a drill according to the invention.
Figure 2:
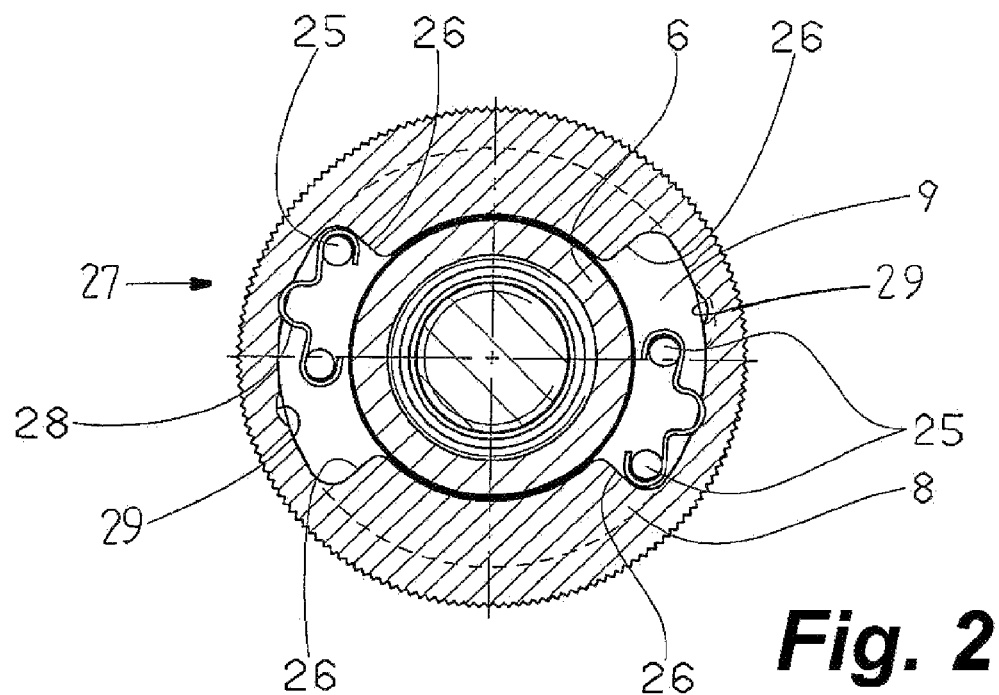
FIGS. 2 and 3 are sections taken along respective lines II-II and III-III of FIG. 1.
Figure 3:
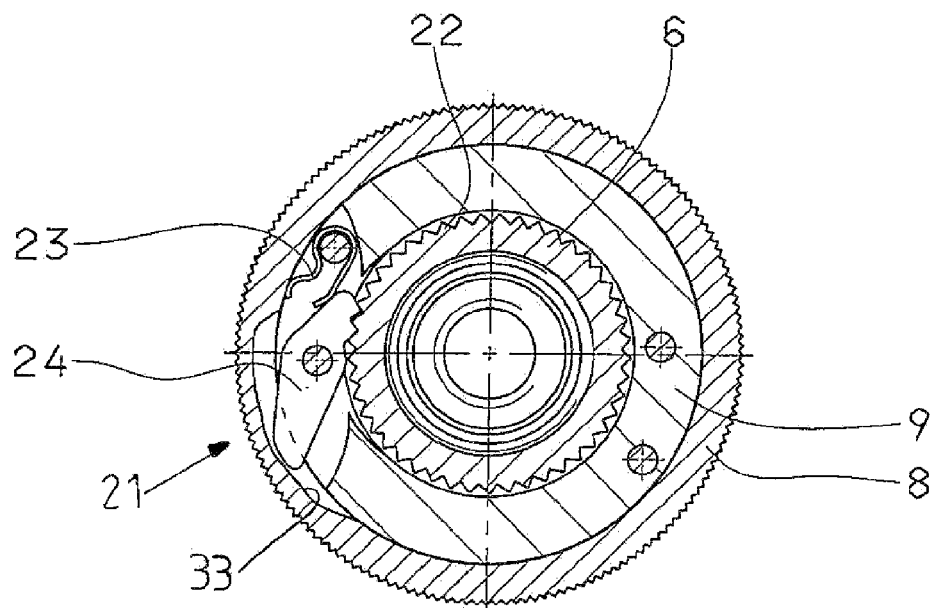

As seen in FIGS. 1-3 a drill 1 has a housing 2 with a nose 3 from which a drilling spindle 4 projects along an axis 14. A chuck 5 carried on the spindle 4 comprises a chuck body 6 with a spindle hole 7 screwed onto the drilling spindle 4. Furthermore, the drill chuck 5 comprises an outer sleeve 8 that is rotatable coaxially on the chuck body 6 and supported axially on a ring 9 mounted on the chuck body 6. Jaws 11 are guided in guide slots 10 of the sleeve 8 and are also radially slidable in a coupling body 12 so that they can move axially forward (downward in FIG. 1) and radially inward to tighten on a tool and oppositely to retract from it and loosen. This action is the result of relative motion between the chuck body 6 and the sleeve assembly formed by the outer sleeve 8 and ring 9. To this end, the coupling body 12 engages with an external thread 13 in an internal thread 15 of a forwardly open hole 16 of the chuck body 6. The forwardly open hole 16 of the chuck body 6 has a larger diameter than the spindle hole 7. The drilling spindle 4 in the spindle hole 7 projects axially forward into the forwardly open hole 16 of the chuck body 6. Furthermore, the coupling body 12 forms on its axial rear end facing the drilling spindle 4 a blind hole 17 whose inside diameter is greater than the outside diameter of the drilling spindle 4, so that the coupling body 12 in the axially rear extreme position during opening of the drill chuck 5 or during the tightening overlaps the drilling spindle 4 with a large-diameter rear end and, as a result of this overlap, the drill chuck 5 is shorter, particularly with respect to the chuck body 6.

Figure 4:
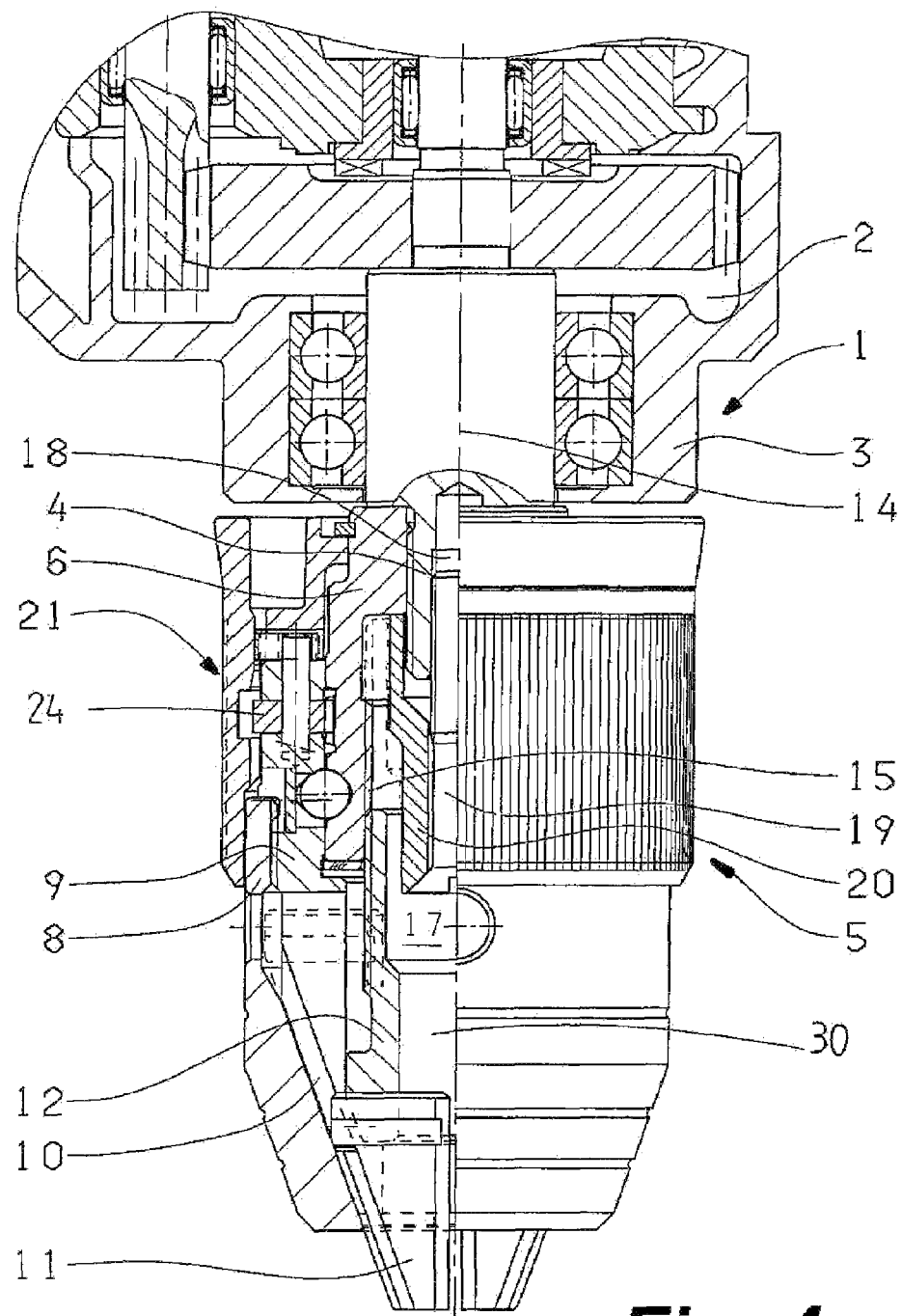
FIGS. 4 and 5 are sections like FIG. 1 of further drills in accordance with the invention.
Figure 5:
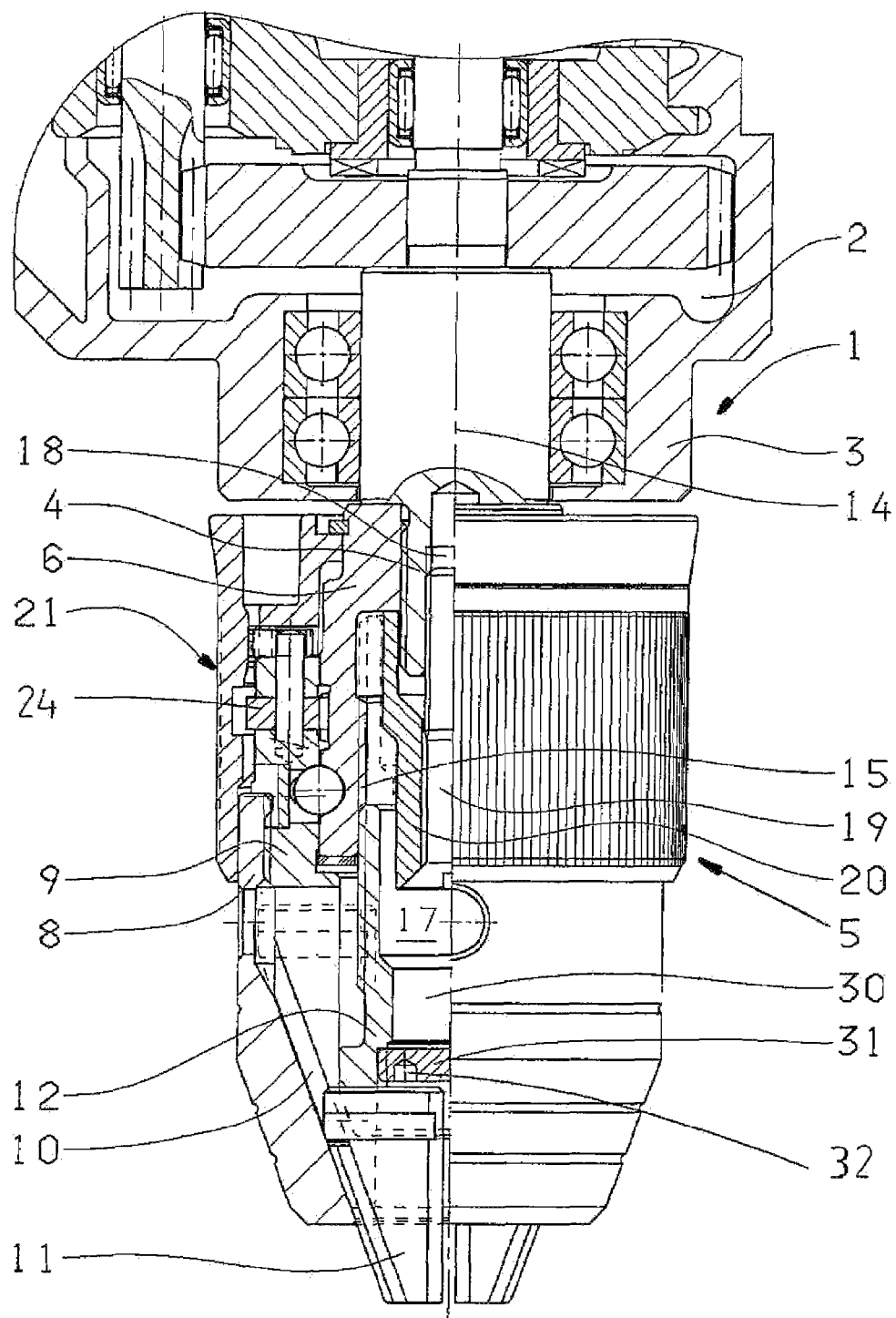

FIG. 4 shows that on the end of the drilling spindle 4 facing the coupling body 12 a locking system 18 is configured for receiving a locking sleeve 20 that has a rear end fitting snugly around the front end of the spindle 4 and that bears axially rearward on a shoulder of the chuck body. A fastener 19, here a screw, has a shaft threaded on the axis 14 into the shaft 4 and a head bearing axially rearward on the front end of the sleeve 20 for locking this part in place and preventing the chuck body 6 from coming unscrewed. To ensure that the fastener 19 is easily accessible, the coupling body 12 is formed with an axial passage 30 from the axial front end to the hole 17, the axially front end of the axial passage 30 being covered as shown in FIG. 5 by a cover plate 31 that has an external thread for interaction with an internal thread formed in the axial passage 30. To ensure that the cover plate 31 can be screwed in, it has a non-circular tool seat 32 on its face directed away from the drilling spindle 4, which seat 32 allows a tool to be fitted to the plate 31. The seat 32 is not situated on the axis 14 so that a drill bit cannot wedge in it and loosen the plate 31.

FIG. 2 shows a detent arrangement 27 comprised of a pair of generally omega-shaped spring 28 each fitted over two respective stop pins seated in the ring 9. The sleeve 8 is formed with a pair of inwardly open notches bounded by stop faces 26 that can engage the pins 25 to define a pair of end positions, in each of which center parts of the springs 28 fit in seats 29 in the sleeve 8 to define end positions for it. Thus the detent arrangements define stable end positions holding the sleeve 8 in tightening and loosening end positions.

The drill chuck 5 furthermore comprises as shown in FIG. 3 a latch system 21 comprising an annular array of teeth 22 centered on the chuck axis 14 and formed on the body 6 and a pawl 24 having an end pressed against the teeth 22 by a spring 23. This pawl 24 is in fact pivoted on one of the pins 25 and the spring 23 is a hairpin spring fitted to another one of the pins 25, and both the pawl 24 and the spring 23 are mounted on the ring 9. The outer sleeve 8 is formed with a cam recess 33 that, in one end position of the sleeve 8, moves off the outer end of the pawl 24 so the sleeve 8 pushes it in so the inner end of the pawl 24 pulls away from the teeth and allows the chuck 5 to be loosened. In the other end position the cam 33 moves into position aligned with the pawl 23 and allows it to pivot in and prevent loosening of the chuck 5 by engaging between the teeth 22.

I claim:

1. A drill comprising:
   a drive unit having an output drive spindle having a threaded outer end of a predetermined small diameter and centered on and rotatable about an axis;
   a chuck body having a forwardly open large-diameter threaded bore centered on the axis, a rearwardly open bore also centered on the axis and of the small diameter, and an annular array of radially outwardly projecting teeth centered on the axis, the spindle end being threaded into the small-diameter bore and projecting axially forward into the large-diameter bore;
   a sleeve assembly formed by
   an outer adjustment sleeve extending generally a full axial length of the chuck body and
   an inner ring riding on the chuck body and at least limitedly rotatable relative to the outer sleeve, the sleeve assembly being axially fixed but rotatable on the chuck body and formed centered on the axis with a plurality of axially extending, angularly spaced, and forwardly open angled guides;
   respective jaws slidable along the guides;
   a latching pawl pivotal on the inner ring between a latching position engaging the teeth and preventing rotation of the sleeve relative to the chuck body in a loosening direction and a freeing position permitting such rotation;
   a spring urging the latching pawl into the latching position;

a pair of pins set in the inner ring and a pair of angularly offset and angularly confronting faces formed in the outer sleeve and engageable with the pins, the faces being angularly more widely spaced than the pins, the pins and faces defining for the outer sleeve a pair of angularly offset end positions relative to the inner ring;

means including a cam on the outer sleeve and engageable with the pawl for holding the pawl in the freeing position in one of the end positions of the outer sleeve; and a coupling body having a large-diameter rear end threaded into the forwardly open large-diameter bore of the chuck body and a front end fitted to and angularly coupled to the jaws, whereby rotation of the sleeve assembly, jaws, and coupling body relative to the chuck body axially shifts the coupling body in the chuck body and axially and radially slides the jaws in their guides.

2. The chuck defined in claim 1 wherein the rear end of the coupling body is tubular and fits around and axially overlaps the spindle outer end in a rearmost position of the coupling body corresponding to a widest-spread position of the jaws.

3. The chuck defined in claim 1 wherein the outer end of the spindle is formed with an axially forwardly open and axially centered locking hole, the chuck further comprising:

a locking body in the forwardly open bore of the chuck body bearing axially rearward on the chuck body; and a locking fastener engaged in the locking hole and bearing axially rearward on the locking body, the coupling body being tubular and axially forwardly open for access to the locking fastener.

4. The chuck defined in claim 3 wherein the locking body is a sleeve coaxially surrounding the spindle outer end.

5. The chuck defined in claim 4 wherein the fastener is a screw threaded in the locking hole and having a head bearing on an outer end of the locking body.

6. The chuck defined in claim 1, further comprising
detent means including another spring carried on the pins and bearing radially outward on the outer sleeve, the outer sleeve being formed with a pair of inwardly open seats in which the other spring engages in the end positions of the outer sleeve, whereby the other spring releasably retains the outer sleeve in its end positions.

7. The chuck defined in claim 1 wherein the coupling body is tubular and axially forwardly open, the chuck further comprising
a cover plate axially forwardly closing the coupling body.

8. The chuck defined in claim 7 wherein the cover plate is threaded into the coupling body.

9. The chuck defined in claim 7 wherein the cover plate has an outer face formed with an axially forwardly open tool seat.

10. The chuck defined in claim 9 wherein the tool seat is offset from the axis.

* * * * *